United States Patent
Fox et al.

(10) Patent No.: US 6,733,064 B2
(45) Date of Patent: May 11, 2004

(54) IMPACT ABSORBING ASSEMBLY FOR VEHICLE INTERIOR SYSTEMS AND SEAT BACKS

(75) Inventors: David M. Fox, Wixom, MI (US); George B. Byma, Clarkston, MI (US); Joseph J. Grajewski, Jackson, MI (US); Timothy R. Hubbert, Novi, MI (US); Arun A. Chickmenahalli, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/273,007

(22) Filed: Oct. 17, 2002

(65) Prior Publication Data

US 2003/0038499 A1 Feb. 27, 2003

Related U.S. Application Data

(63) Continuation-in-part of application No. 09/927,154, filed on Aug. 10, 2001, now Pat. No. 6,557,929.
(60) Provisional application No. 60/356,428, filed on Feb. 12, 2002.

(51) Int. Cl.$^7$ ................................. B60N 2/02
(52) U.S. Cl. ............... 296/68.1; 296/187.05; 280/751
(58) Field of Search .......... 296/189, 63, 68.1, 296/187.05; 280/751, 748; 188/371, 375, 376, 377; 297/216.1, 216.13, 216.12, 216.14

(56) References Cited

U.S. PATENT DOCUMENTS

| 802,727 A | 10/1905 | Alschuler |
| 1,630,459 A | 5/1927 | Zeidler |
| 1,918,149 A | 7/1933 | Sullivan |
| 3,195,686 A | 7/1965 | Johnson |
| 3,762,505 A | 10/1973 | Morse |

(List continued on next page.)

FOREIGN PATENT DOCUMENTS

| DE | 31 16498 A1 | 11/1982 |
| DE | 198 25 040 | 3/1999 |
| DE | 199 47 245 | 4/2000 |
| DE | 199 58 299 | 6/2001 |
| EP | 0 795 430 A2 | 9/1997 |
| EP | 0 795 430 A3 | 4/2000 |
| GB | 2073678 A | 10/1981 |
| JP | 52-37317 | 8/1977 |
| JP | 58-39545 | 3/1983 |
| WO | WO/00/31434 | 6/2000 |

*Primary Examiner*—Jason Morrow
(74) *Attorney, Agent, or Firm*—Bill C. Panagos

(57) ABSTRACT

An impact absorbing and method for making the same. The impact absorbing assembly for vehicle interiors includes a body having tabs that are connected to the body by a bendable hinge. The body may be either secured to a structural member, a vehicle seat, a trim piece or may be formed integrally from part of a structural component making up part of the vehicle. The impact absorbing assembly may be disposed behind a covering layer or seat back shell.

14 Claims, 8 Drawing Sheets

U.S. PATENT DOCUMENTS

| Patent | | Date | Inventor(s) | Ref |
|---|---|---|---|---|
| 3,877,749 | A * | 4/1975 | Sakurai et al. | 297/216.14 |
| 3,930,665 | A | 1/1976 | Ikawa | |
| 4,190,276 | A | 2/1980 | Hirano et al. | |
| 4,711,424 | A | 12/1987 | Neubert et al. | |
| 4,790,209 | A | 12/1988 | Ishida | |
| 5,040,646 | A | 8/1991 | Drefahl | |
| 5,054,845 | A * | 10/1991 | Vogel | 297/216.14 |
| 5,306,066 | A | 4/1994 | Saathoff | |
| 5,398,989 | A | 3/1995 | Winter et al. | |
| 5,433,478 | A | 7/1995 | Naruse | |
| 5,468,044 | A | 11/1995 | Coman | |
| 5,560,672 | A | 10/1996 | Lim et al. | |
| 5,580,091 | A | 12/1996 | Doty | |
| 5,593,182 | A | 1/1997 | Frost | |
| 5,639,144 | A | 6/1997 | Naujokas | |
| 5,641,195 | A | 6/1997 | Patel et al. | |
| 5,785,303 | A | 7/1998 | Kutschi | |
| 5,795,013 | A | 8/1998 | Keller et al. | |
| 5,833,304 | A | 11/1998 | Daniel et al. | |
| 5,836,641 | A | 11/1998 | Sugamoto et al. | |
| 5,851,626 | A | 12/1998 | McCorry et al. | |
| 5,884,962 | A | 3/1999 | Mattingly et al. | |
| 5,979,139 | A | 11/1999 | Early | |
| 5,988,305 | A * | 11/1999 | Sakai et al. | 296/189 |
| 6,003,937 | A | 12/1999 | Dutton et al. | |
| 6,012,764 | A | 1/2000 | Seksaria et al. | |
| 6,036,227 | A | 3/2000 | Lin et al. | |
| 6,042,176 | A | 3/2000 | Ikeda et al. | |
| 6,062,642 | A | 5/2000 | Sinnhuber et al. | |
| 6,086,098 | A | 7/2000 | Reiter et al. | |
| 6,142,522 | A | 11/2000 | Bossenmaier | |
| 6,142,563 | A * | 11/2000 | Townsend et al. | 297/216.1 |
| 6,145,908 | A | 11/2000 | Deb et al. | |
| 6,170,808 | B1 | 1/2001 | Kutschi | |
| 6,186,582 | B1 | 2/2001 | Bechmann | |
| 6,199,907 | B1 | 3/2001 | Mugford et al. | |
| 6,199,941 | B1 | 3/2001 | Takahara et al. | |
| 6,199,942 | B1 | 3/2001 | Carroll III | |
| 6,234,526 | B1 | 5/2001 | Song et al. | |
| 6,244,626 | B1 | 6/2001 | Monaghan et al. | |
| 6,244,638 | B1 | 6/2001 | Kuczynski et al. | |
| 6,247,745 | B1 | 6/2001 | Carroll III | |
| 6,290,272 | B1 | 9/2001 | Braun | |
| 6,364,359 | B1 | 4/2002 | Dietrich | |
| 6,367,859 | B1 | 4/2002 | Flory et al. | |
| 2001/0045762 | A1 | 11/2001 | von Holst et al. | |

* cited by examiner

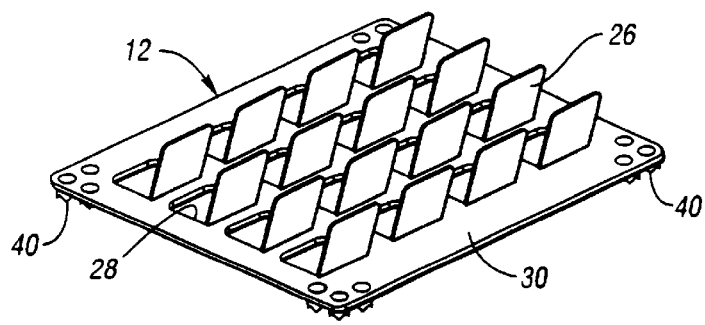
*Fig. 3a*  *Fig. 3b*
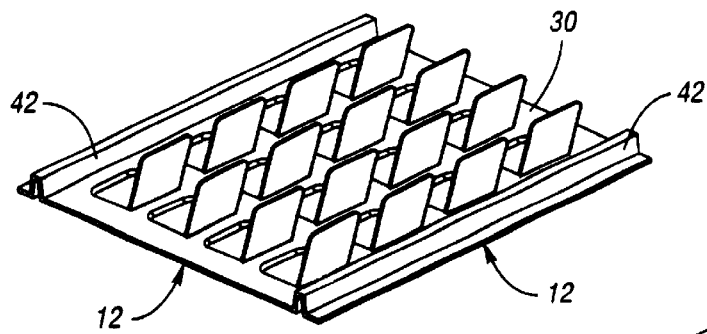
*Fig. 4*
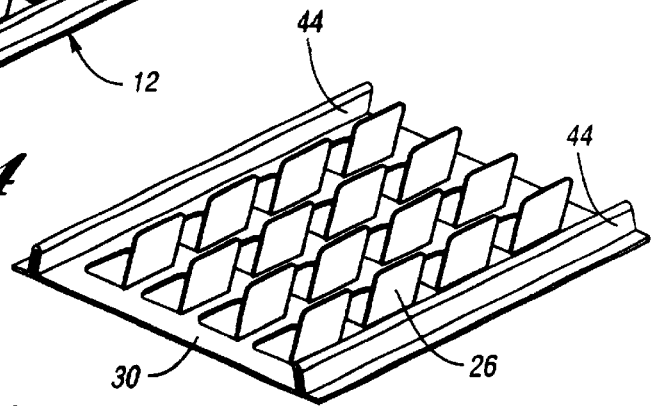
*Fig. 5*
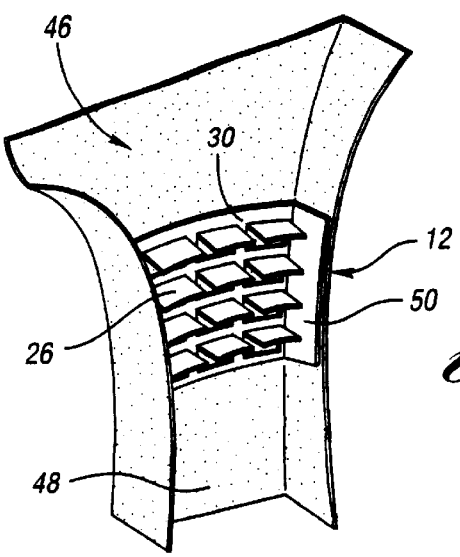
*Fig. 6*

IMPACT ABSORBING ASSEMBLY FOR VEHICLE INTERIOR SYSTEMS AND SEAT BACKS

CROSS-REFERENCE TO RELATED APPLICATIONS

This application is a continuation-in-part of U.S. application Ser. No. 09/927,154 filed Aug. 10, 2001,now U.S. Pat. No. 6,557,929 and also claims the benefit of U.S. provisional application Ser. No. 60/356,428, filed Feb. 12, 2002.

BACKGROUND OF THE INVENTION

1. Field of the Invention

The present invention relates to a method and apparatus for absorbing energy when a body part of an occupant of a vehicle contacts an interior part of the vehicle, thereby reducing the trauma caused by the impact. More particularly, one embodiment of the present invention relates to an impact absorbing member that may be disposed between a trim member and a vehicle seat structural member to create a crash pad for rear seat occupants on the rearwardly facing surface of a vehicle seat.

2. Background Art

Automobile interiors are designed to incorporate both active and passive occupant protection systems. An example of an active occupant protection system is the well known inflatable air bag that is deployed upon impact. Passive impact absorbing systems include foam padding, ribs on plastic trim parts, aluminum honeycomb pads, and the like. One example of a static system is energy absorbing elements incorporated into a headliner. Vehicle headliners line the inner surface of a vehicle roof and may include foam padding, aluminum honeycomb structures, paper, foil and plastic pre-forms. One product known as "O-Flex" that is sold by a company of the same name comprises a wound paper/foil member formed in a generally square tube configuration.

The cost of engineering and manufacturing a wide variety of impact absorbing products adds to the total cost of the vehicle. The use of a plethora of different impact absorption products complicates computer-aided design and computer simulation for optimization of impact absorption systems. Energy absorbing countermeasures must be designed to provide specified levels of impact protection within certain space limitation parameters. Availability of a myriad of different impact countermeasure products increases the cost of engineering due to the difficulty of matching products to applications. Further, many impact energy absorbing countermeasure products are relatively high-cost components.

With prior art impact absorbing products, design flexibility is limited in many instances and optimum performance for various impact mechanics systems of various vehicles is difficult to achieve.

Aluminum honeycomb energy absorbing parts or O-Flex type products are complex sub-assemblies. Such products may be made of aluminum honeycomb material or exotic combinations of materials to meet exacting impact absorption standards within limited spaces defined between decorative trim members and structural body parts.

The use of aluminum, cardboard, plastic, and other materials also results in additional cost due to the need to meet performance standards within design parameter temperature specifications. Different types of plastics, foams, and composite materials all have different temperature characteristic profiles that require rigorous product testing to assure compliance with impact standards and constant performance at all foreseeable temperatures.

There is a need for an impact absorption product that offers maximum design flexibility and ensures optimum impact absorbing performance in a variety of vehicles. There is also a need for a low cost impact energy absorbing countermeasure product that may be manufactured using efficient metal stamping processes. There is also a need for an all metal impact countermeasure product that is unaffected by temperature and is less dependent on rate of strain, thus lending itself to simplified computer simulation and optimization of designs. There is also a need for impact countermeasure products that may be used in headliners, roof support pillars, doors, dashboards, sunroof frames, and the like.

Vehicle seats are subject to designs standards for collision energy absorption. Vehicle seats such as that shown in FIG. 25 of the attached drawings have been designed to include expanded polypropylene foam blocks A in the corners of the seat back shell B between the seat back shell B and the structural frame C of the seat. Expanded polypropylene foam has been found to be relatively inefficient at absorbing energy. Energy absorption is measured by determining the level of deceleration over the time period over which an impact condition occurs. The level of deceleration must be less than a threshold value if the impact duration lasts more than a predetermined time interval.

Some disadvantages relating expanded polypropylene foam energy absorbing members include the cost of these and other engineered foam products. Other disadvantages associated with expanded polypropylene foam include the difficulty of assuring precise control of energy absorption efficiency. Further, expanded polypropylene foams tend to be subject to variability in the manufacturing process. Variations in blowing agent activity, humidity and temperature may affect the impact absorption characteristics of manufactured engineered foam products.

These and other needs and problems associated with prior art products are addressed by the present invention as summarized below.

SUMMARY OF THE INVENTION

According to one aspect of the present invention, a vehicle interior is provided with an impact absorbing assembly. The impact absorbing member is attached to a trim component with the vehicle interior. The impact absorbing member may comprise a sheet form body portion and a plurality of tabs extending from the body portion. The tabs are partially separated from the body portion and a bendable hinge connection is provided along at least one edge of each tab where the tabs are still attached to the body portion but are bent so that the tab extends from the body portion. A covering layer is applied to the body portion on the side facing away from the structural component.

According to another aspect of the invention, an impact absorbing assembly is provided on an existing structural component of a vehicle interior. The structural component of the vehicle interior functions as an impact absorbing member having a body portion and a plurality of tabs extending from the body portion. The tabs are partially separated from the body portion with a bendable hinge connection being provided along at least one edge of each tab. A covering layer is applied to the structural component to cover the tabs for aesthetic purposes.

According to another aspect of the invention, a method of making an impact absorbing assembly for a vehicle is provided. The method includes the step of providing a sheet metal member and partially severing at least one tab from the sheet metal member. The tab is bent to extend outwardly from one side of the sheet metal member to thereby form a bendable hinge connection between the body portion and the portions of the tab that are not severed from the body portion where the tab is bent outwardly from the body portion.

According to another aspect of the method of the present invention, a method is disclosed for absorbing impact forces that are applied when an occupant of a vehicle hits a structural component of a vehicle interior. The method includes providing on a structural component an impact absorbing member having a sheet form body portion and a plurality of tabs extending from the body portion. The tabs are partially separated from the body portion with a bendable hinge connection being provided along at least one edge of each tab. When a force is applied to the occupant of the vehicle, it may cause the occupant to contact the impact absorbing member with an amount of force greater than a threshold value. When the occupant contacts the impact absorbing member with a force grater than the threshold value, the tabs are plastically deformed thereby absorbing a part of the force applied to the impact absorbing member by the occupant.

According to other aspects of the invention, the tabs may extend either toward or away from the structural component. The tabs may be arranged in rows or columns. The tabs may be contoured, either individually or relative to adjacent tabs. The impact absorption characteristics of the assemblies may be modified by changing the height of the tabs, thickness of the material, spacing of the tabs, angle of the tab relative to the body portion and arrangement of the tabs on the body portion. The impact absorption characteristics of the assembly may also be modified by changing the geometric configuration of the tabs. The tabs may be flat tabs or may include stiffening ribs, a plurality of planar walls, or curved walls. The tabs may be arranged in groups in a circular pattern around an opening or may be formed to include two or more bendable hinge connections to the body portion. The tabs may also be formed in a partially circular shape or may be formed with a central wall having two sidewalls connecting the central wall to the body portion. The tabs may be formed to extend from one or both sides of the body portion of the sheet and may be formed in a wide variety of geometric shapes including an L-shaped configuration, or the like.

According to another aspect of the invention, the body portion of the impact absorbing member may be formed as a flat or curved member. The body portion may also include one or more stiffening ribs. Further, the body portion may include surface features such as holes or metal stake fasteners formed around a pierced hole that provide jagged edges that facilitate securing the impact absorbing member to a structural member or the covering layer.

According to another aspect of the invention, the structural member may be a roof support pillar, dashboard, roof edge, or other interior part that is covered by a molded plastic trim piece. The impact absorbing member may be attached to the trim piece prior to the trim piece being attached to the structural member. Further, the impact absorbing member may have a curved central wall and at least one sidewall that conform to an inner surface of the plastic trim piece.

According to still another aspect of the invention, the body portion of the impact absorbing member may have at least one clip provided thereon for attaching a wiring harness to the impact absorbing member.

According to yet another aspect of the invention, design flexibility is maximized to permit optimization of impact absorbing assemblies in a wide range of vehicles. The impact absorption characteristics of the assembly may be modified by changing the size, shape, and placement of the tabs.

According to a further aspect of the invention, the impact absorbing member is preferably formed of steel or aluminum and may be formed by standard stamping processes. Since the impact absorbing member is formed of metal, the stress-strain properties are less dependent on the rate of strain which permits simpler computer simulation for part design and verification of impact absorption characteristics. Metal construction also ensures consistent performance in a wide range of temperatures.

According to another aspect of the present invention, a vehicle seat is provided with an impact absorbing assembly. The impact absorbing assembly is attached to the seat back shell between a portion of the seat back shell and a structural component of the vehicle seat. The impact absorbing member is a metal member that is designed in the form of a bendable hollow structure that may be bent where an adjacent walls intersect or in the form of tabs that may be bent at a bendable hinge.

According to the method of the invention, an impact absorbing assembly is provided as part of a vehicle seat by initially forming a sheet metal member by conventional sheet metal roll forming or sheet metal fabricating processing techniques. After forming, the metal impact absorbing member is assembled to the vehicle seat back between the vehicle seat back and a structural portion of the seat back. A plurality of metal impact absorbing members may be provided about the periphery of the vehicle seat back or at an interior location thereof. The seat back shell is assembled to the vehicle seat with a metal impact absorbing member being oriented to bend in the event the rearwardly facing surface of the vehicle seat is impacted during a collision.

According to one embodiment of the present invention the metal impact absorbing members include a metallic body having a plurality of tabs cut from the body that are bent at a bendable hinge to an approximately perpendicular orientation relative to the metal body.

These and other features and advantages of the present invention will be better understood by one of ordinary skill in the art in view of the attached drawings and in light of the following detailed description of several modes of practicing the invention.

BRIEF DESCRIPTION OF THE DRAWINGS

FIG. 3a is a perspective view of a impact absorbing assembly that includes metal stake fasteners;

FIG. 3b is a fragmentary perspective view showing the metal stake fasteners;

FIG. 4 is a perspective view of an impact absorbing assembly having stiffening ribs;

FIG. 5 is a perspective view of an impact absorbing assembly having integrally formed rails;

FIG. 6 is a perspective view of a pillar trim piece having an impact absorbing assembly assembled thereto;

DETAILED DESCRIPTION OF THE PREFERRED EMBODIMENT(S)

Figure 1:
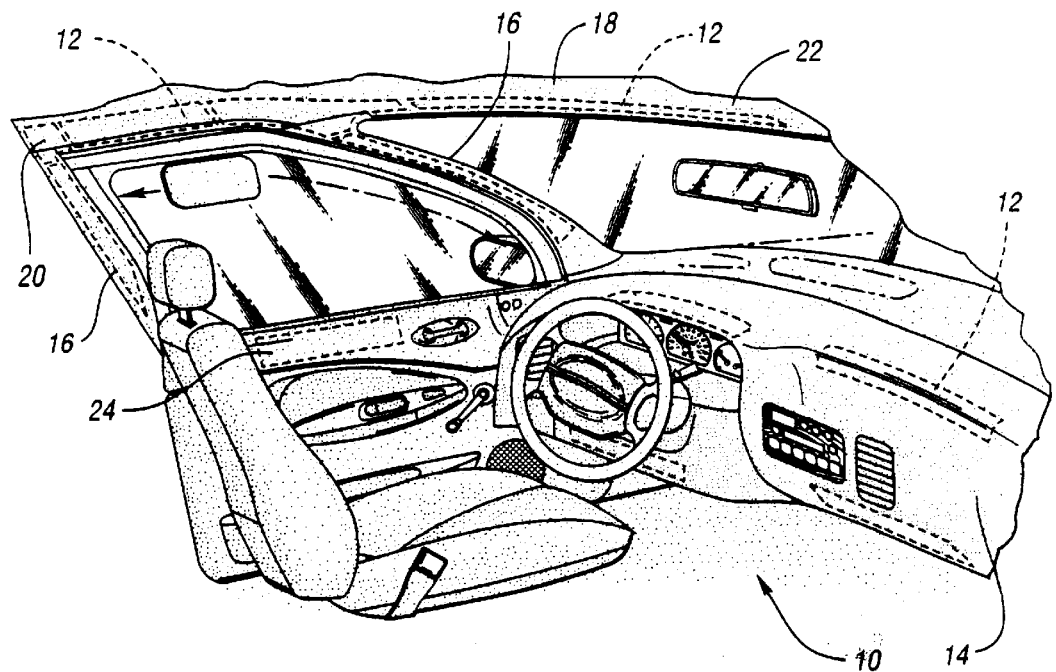
FIG. 1 is a fragmentary perspective view of a vehicle interior equipped with several impact absorbing assemblies made according to the present invention.

Referring now to FIG. 1, a vehicle interior 10 is provided with a plurality of impact absorbing assemblies 12 shown in phantom in various locations in the vehicle interior. It should be understood that the impact absorbing assemblies 12 may be placed in many different locations within a vehicle interior.

For example, the impact absorbing assemblies 12 may be located on the dashboard 14, roof support pillars 16, and above the headliner 18. The headliner 18 may have impact absorbing members 12 located in the areas of the roof rail 20 or windshield header 22. The door 24 may also be advantageously provided with one or more impact absorbing assemblies 12.

Figure 2:
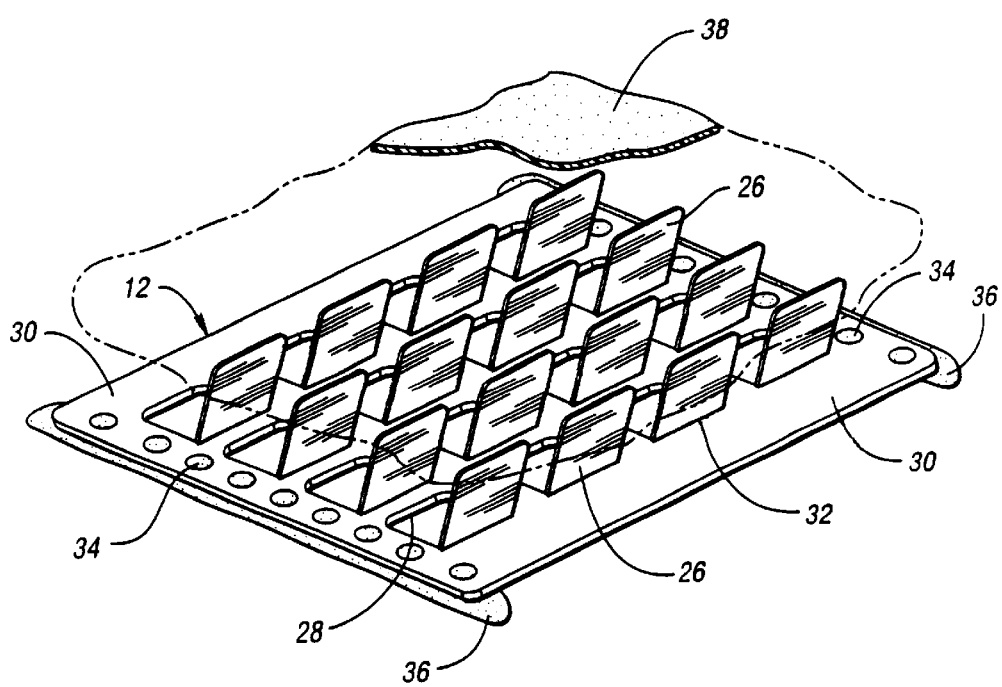
FIG. 2 is a perspective view of an impact absorbing assembly that is adapted to be adhesively secured.
Figure 7:
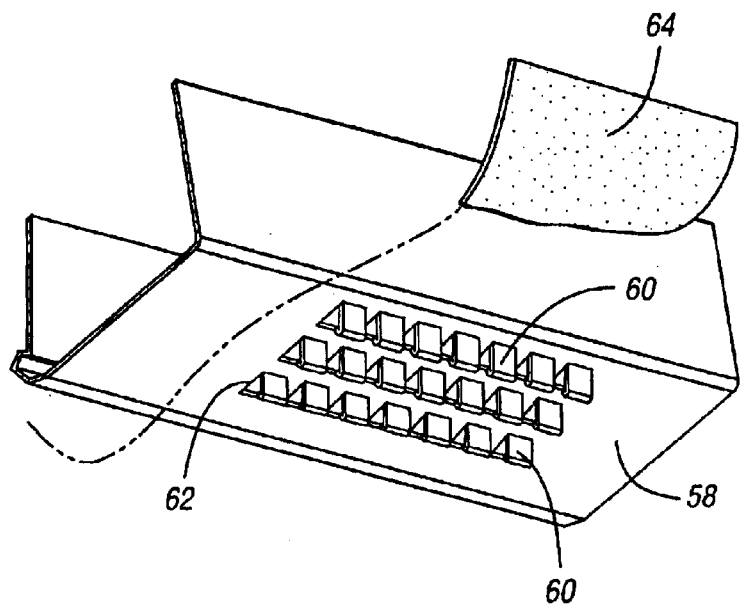
FIG. 7 is a fragmentary perspective view of a roof support pillar having a plurality of impact absorbing tabs formed therein.

Referring now to FIG. 2, one example of an impact absorbing assembly 12 made according to the present invention is shown to include a plurality of tabs 26 and apertures 28 that are formed in a body portion 30. The tabs 26 are punched by sheet metal forming processes from the body portion on three sides forming the aperture 28 with the fourth side of the aperture 28 comprising a bendable hinge 32.

As shown in FIG. 2, the body portion 30 includes a series of holes 34 on two edges that facilitates securing the impact absorbing assembly 12 to a supporting surface by means of an adhesive 36. A covering layer 38 is shown partially in phantom lines that covers the impact absorbing assembly 12.

Referring now to FIGS. 3a and 3b, an alternative embodiment of the present invention is shown wherein metal stake fasteners 40 are formed at the corners of the body portion 30. The metal stakes are provided to facilitate securing the impact absorbing assembly 12 to a supporting surface.

Referring now to FIG. 4, an impact absorbing assembly 12 is shown to include two space parallel ribs 42. The ribs 42 are provided to stiffen the body portion 30 and also may facilitate securing the impact absorbing assembly 12 to a supporting surface.

Referring now to FIG. 5, an alternative embodiment is shown wherein parallel rails 44 are provided on the body portion 30 that are integrally formed on opposite sides of the array of tabs 26.

Referring now to FIG. 6, a pillar trim piece 46 is shown in conjunction with an impact absorbing assembly 12. The impact absorbing assembly 12 has a body portion 30 from which the tabs 26 are formed. The door trim piece 46 includes an inner surface 48 to which the impact absorbing assembly 12 is secured. At least one side wall 50 is provided adjacent the body portion 30 so that the impact absorbing assembly may be assembled to several surfaces of the pillar trim piece 46.

Referring now to FIG. 2, one example of an impact absorbing assembly 12 made according to the present invention is shown to include a plurality of tabs 26 and apertures 28 that are formed in a body portion 30. The tabs 26 are punched by sheet metal forming processes from the body portion on three sides forming the an aperture 28 with the fourth side of the aperture 28 comprising a bendable hinge 32.

Figure 8:
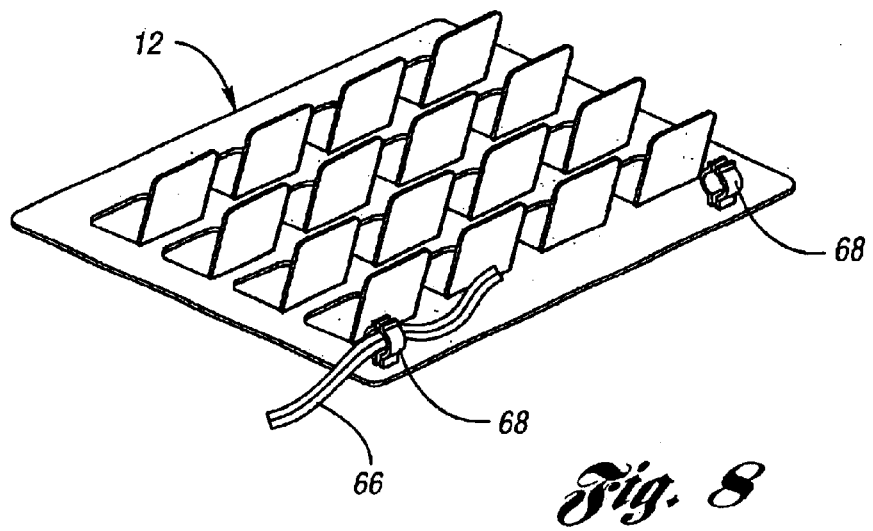
FIG. 8 is a perspective view of a impact absorbing assembly having wire clips for securing a wiring harness thereto.

Referring now to FIG. 8, an alternative embodiment of the impact absorbing assembly 12 is shown wherein a wiring harness 66 is secured to the impact absorbing assembly 12 by one or more wire clips 68.

Figure 9:
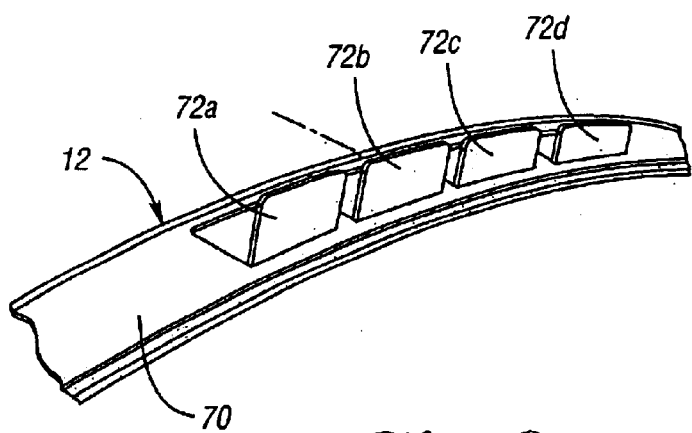
FIG. 9 is a fragmentary perspective view of an impact absorbing assembly having contoured tabs.

Referring now to FIG. 9, an alternative embodiment of the impact absorbing assembly 12 of the present invention is shown wherein a curved member 70 is provided with a plurality of contoured tabs 72a–d are provided. The contoured tabs 72a–d have two generally parallel sides and an upper edge that is angularly oriented relative to the surface of the curved member 70.

Figure 10:
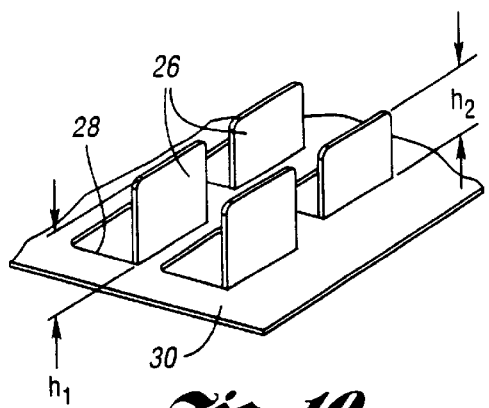
FIG. 10 is a fragmentary perspective view of a impact absorbing assembly illustrating tabs of different heights.
Figure 11:
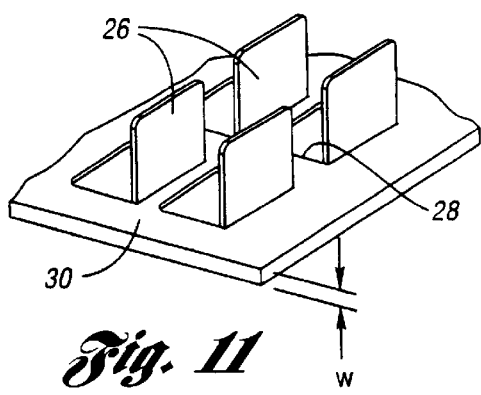
FIG. 11 is a fragmentary perspective view of an impact absorbing assembly having a body portion of increased thickness.
Figure 12:
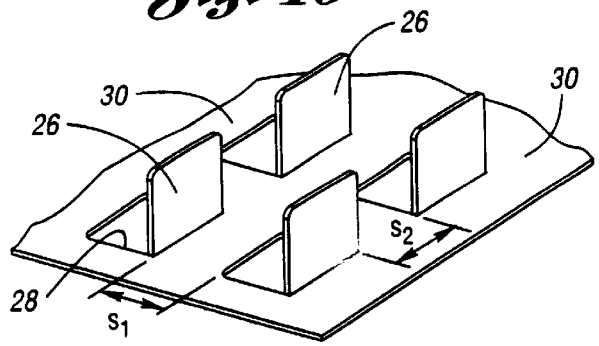
FIG. 12 is a fragmentary perspective view of an impact absorbing assembly illustrating the spacing between rows and columns of tabs.
Figure 13:
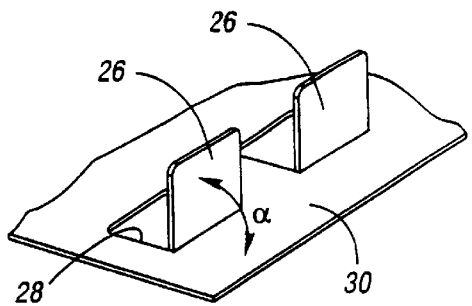
FIG. 13 is a fragmentary perspective view showing the angular orientation of the tabs relative to body portion.

Referring now to FIGS. 10–13 several different design parameters are provided each of which may be modified to change the impact absorption characteristics of the assembly. In FIG. 10, tabs of two different heights are provided with the arrows "$h_1$" and "$h_2$" indicating the difference in heights of adjacent tabs. In FIG. 11 arrows "w" indicate that the thickness of the body portion may be varied to change the impact absorption characteristics of the assembly. FIG. 12 illustrates that spacing areas "$s_1$" and "$s_2$" indicate that the spacing between rows and columns of tabs may also be modified to meet design criteria. FIG. 13 illustrates that the angle of the tabs relative to the body portion as represented by arrow "$\alpha$" may be modified to change the impact absorption characteristics of the assembly.

Figure 14:
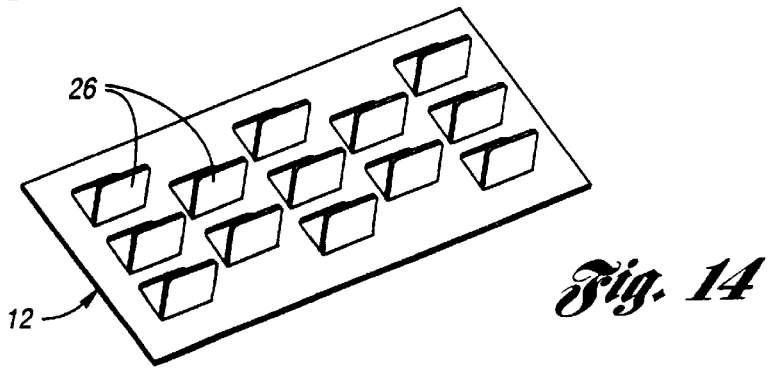
FIG. 14 is a perspective view of an impact absorbing assembly having staggered rows of tabs.

FIG. 14 illustrates an impact absorbing assembly wherein alternating rows of tabs have different numbers of tabs 26 in each row.

Figure 15:
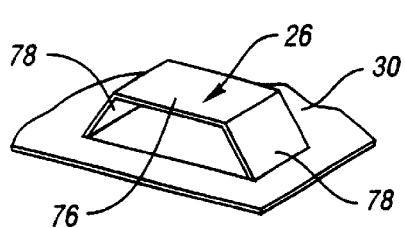
FIG. 15 is a fragmentary perspective view of a tab including side walls that are both attached to the body portion.

FIG. 15 shows an alternative tab construction wherein the tab 26 is connected on two ends to the body portion. The tab 26 includes a central wall 76 and two side walls 78 that are each connected to the body portion 30.

Figure 16:
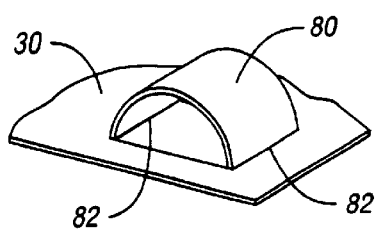
FIG. 16 is a fragmentary perspective view of a curved tab connected at two locations to the body portion.

FIG. 16 shows yet another alternative embodiment tab wherein the tab comprises a curved wall 80 connected on two ends 82 to the body portion 30.

Figure 17:
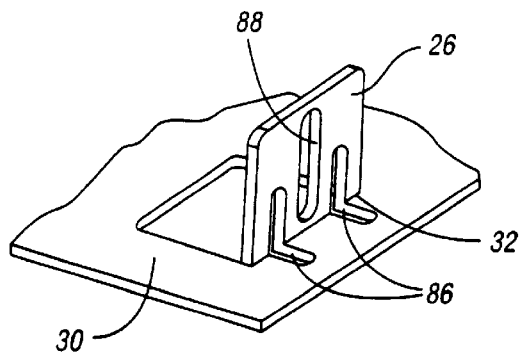
FIG. 17 is a fragmentary perspective view of a tab including openings along a bendable hinge and a slot.

Referring now to FIG. 17 another embodiment of a tab 26 is shown to include a pair of holes 86 and a slot 88. The holes 86 are shown to be located at the bendable hinge 32 and would tend to make the tab 26 less resistant to bending while the aperture or slot 88 may be included to provide bending relief or to reduce the weight of the assembly.

Figure 18:
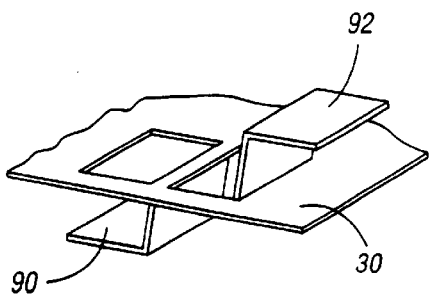
FIG. 18 is a fragmentary perspective view of an impact absorbing member having L shaped tabs extending from opposite sides of a body portion.

Referring now to FIG. 18, another alternative embodiment is shown wherein the tabs do not extend from the same side of the body portion 30. The tabs include an inner L shaped tab 90 and an outer L shaped tab 92. The L shaped tabs 90, 92 each include two legs with one leg extending from the body portion and a second leg extending generally parallel to the body portion 30.

Figure 19:
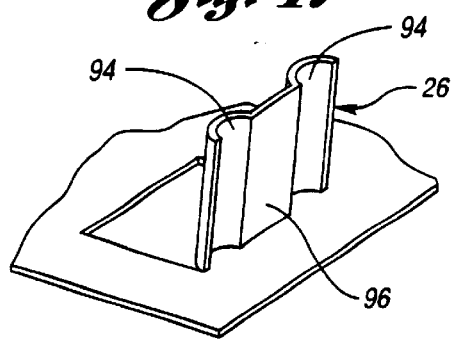
FIG. 19 is a fragmentary perspective view of a tab having ribs on opposite sides of the central flat section.

Referring now to FIG. 19, another alternative embodiment of a tab 26 for use with the impact absorbing assembly of the present invention is shown wherein two curved ribs 94 are provided on opposite sides of a central flat section 96. The ribs 94 and flat section 96 may be formed by sheet metal forming processes such as a progressive sheet metal die into the shape shown. Such processes also may be used to form other types of tabs.

Figure 20:
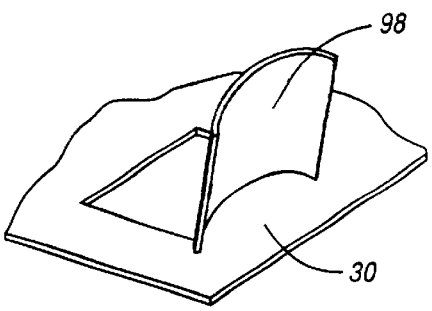
FIG. 20 is a fragmentary perspective view of a curved tab.

Referring now to FIG. 20, an alternative embodiment of an impact absorbing assembly having a curved tab 98 is shown wherein the curved tab 98 is formed from the body portion 30.

Figure 21:
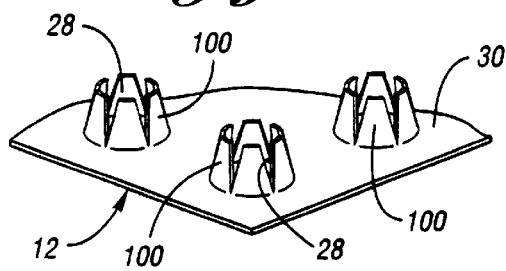
FIG. 21 is a fragmentary perspective view of an impact absorbing member having circularly disposed tabs.

Referring now to FIG. 21, an alternative of an impact absorbing assembly 12 is shown wherein a plurality of tapered tabs 100 are formed from the body portion 30 and are disposed in a circular array around an aperture 28.

Figure 22:
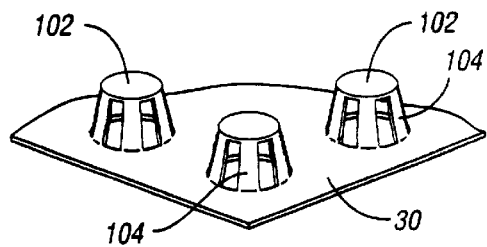
FIG. 22 is a fragmentary perspective view of an impact absorbing assembly having a plurality of circular tabs supported on a body portion by a plurality of ribs.

Referring now to FIG. 22, another alternative embodiment of an impact absorbing assembly is shown wherein a circular tab 102 is supported in a generally parallel orientation relative to the body portion 30 by means of a plurality of spaced ribs 104.

Figure 23:
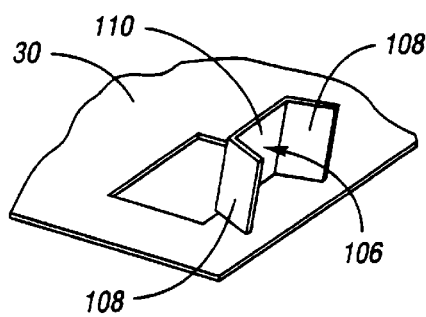
FIG. 23 is an impact absorbing assembly having a tab including wings.

Referring now to FIG. 23, another alternative embodiment of a tab for an impact absorbing member is shown wherein a bifold tab 106 is provided with wings 108 on opposite sides of a central portion 110.

Figure 24:
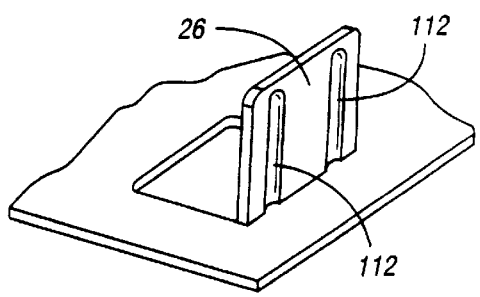
FIG. 24 is a fragmentary perspective view of a tab having spaced ribs.
Figure 25:
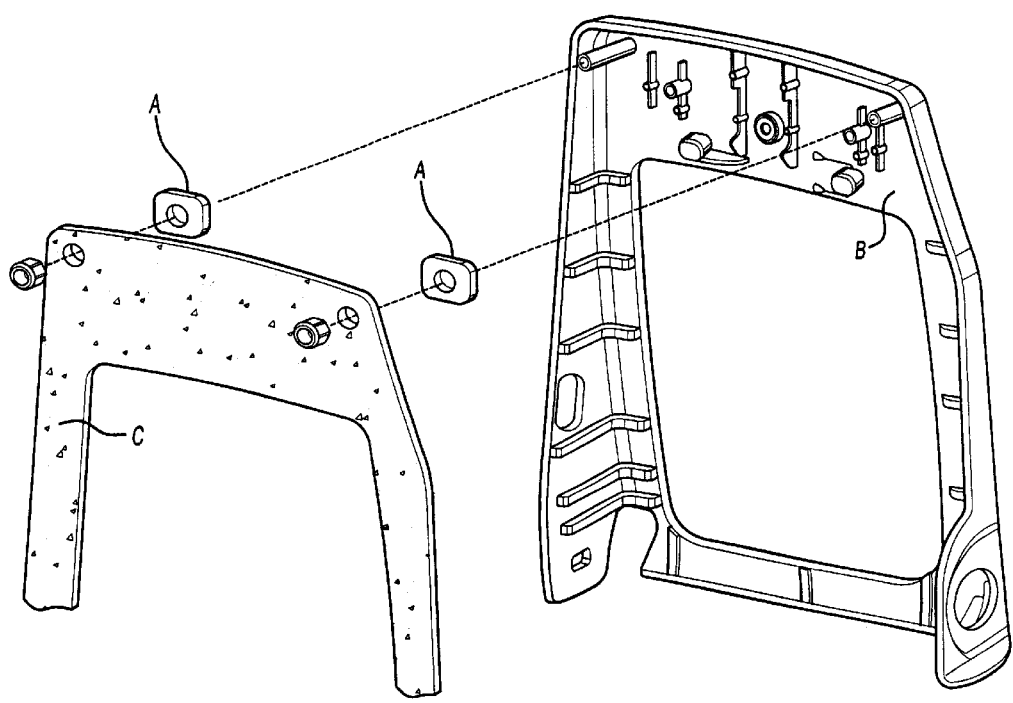
FIG. 25 is an exploded perspective view of a prior art vehicle seat back having an expanded polypropylene foam block deposed between the seat back and the vehicle seat structure.

Referring now to FIG. 24 another embodiment of the present invention is shown wherein a tab 26 is provided with ribs 112 that stiffen the tab 26.

The impact absorbing assembly 12 of the present invention is generally provided in a vehicle interior 10 behind a covering member such as a headliner 18 or inside the vehicle dashboard 14 or door 24. A covering layer is provided to cover the assembly 12 and may be located on the tips of the tabs 26 or on the side of the body portion 30 opposite the tabs 26 if the tabs 26 are provided on one side of the body portion 30. If the impact absorbing assembly 12 has tabs 90, 92 extending on opposite sides of the body portion 30 the covering layer could be provided on either side of the assembly.

In an impact, the impact absorbing assembly 12 functions to absorb the kinetic energy of the impact wherein the tabs 26 are plastically deformed. Plastic deformation of the tabs 26 results in the energy of the impact being absorbed.

Figure 26:
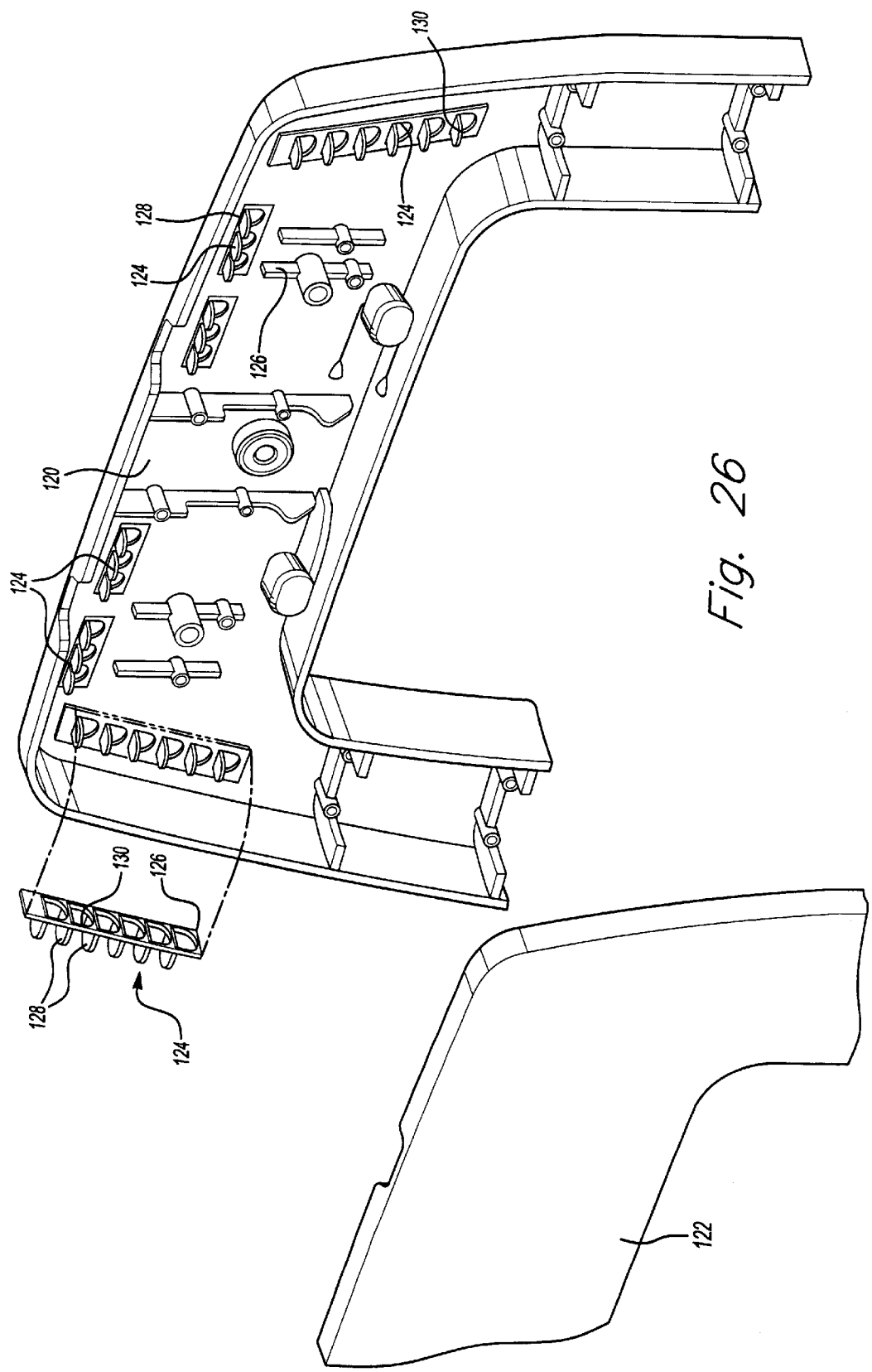
FIG. 26 is a partially exploded fragmentary perspective view of a vehicle seat back shell, a vehicle seat back structural member, and impact absorbing members made in accordance with one embodiment of the present invention.

Referring now to FIG. 26, a seat back shell 120 is adapted to be secured to a seat back structural member 122. A plurality of metal impact absorbing members are secured to the seat back shell 120. As shown in the embodiment of FIG. 26, impact absorbing members 124 are disposed about the periphery of the seat back shell.

Each impact member absorbing member 124 includes a body portion 126 and a plurality of tabs 128 extending from the body portion 126. The tabs 128 are connected to the body portion 126 by means of bendable hinge 130.

Figure 27:
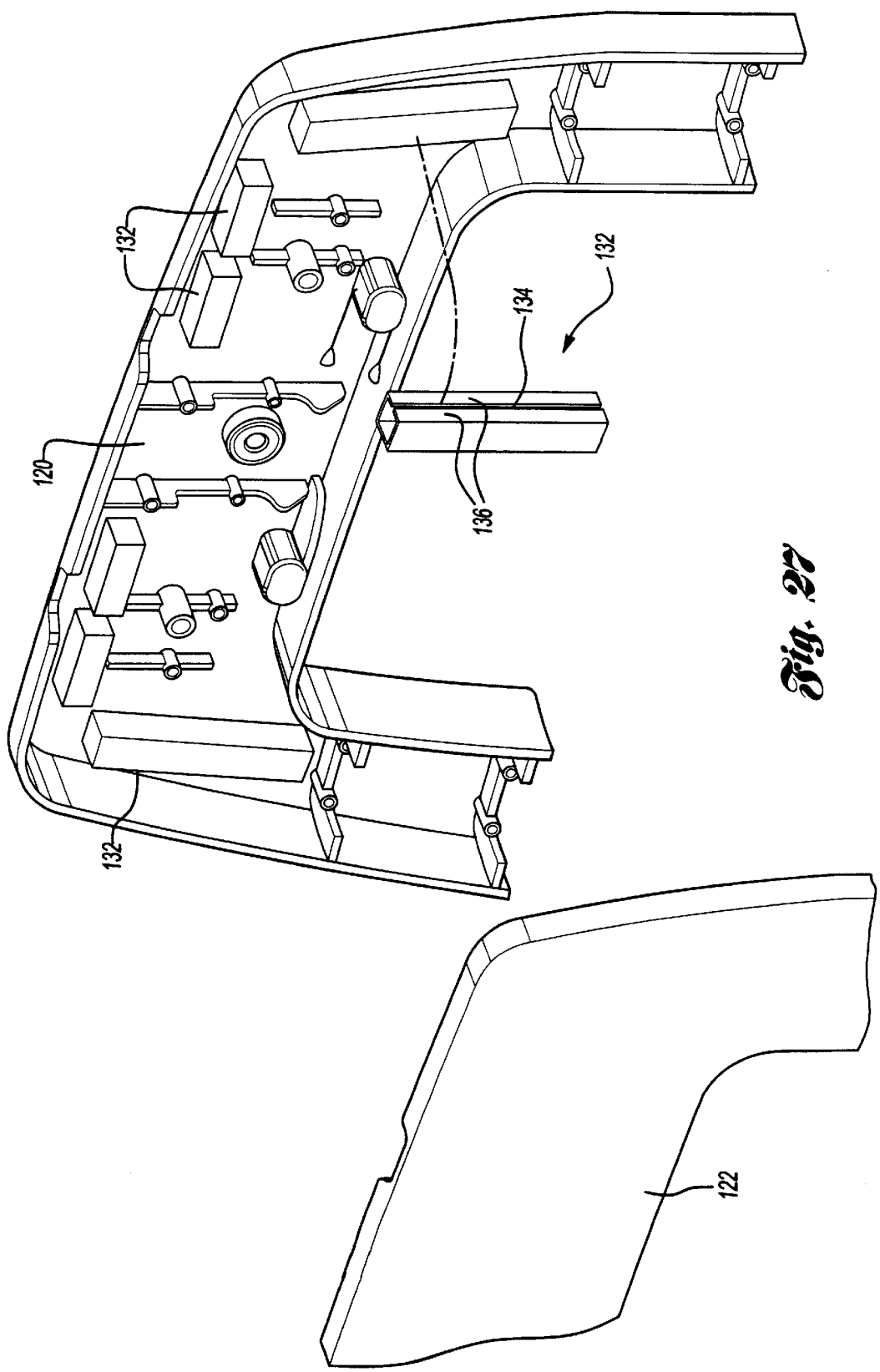
FIG. 27 is a partially exploded fragmentary perspective view of a vehicle seat back shell, a vehicle seat back structural member, and impact absorbing members made in accordance with another embodiment of the present invention.

Referring now to FIG. 27, a seat back shell 120 and a seat back shell structural member 122 are shown in exploded perspective with a plurality of alternative embodiment impact absorbing members 132 secured to the seat back shell 120. The impact absorbing members 132 made according to the alternative embodiment are hollow elongated members having walls that form either a closed or open polygonal shape. In the disclosed embodiment the impact absorbing member 132 may have a square, rectangular, or quadrilateral configuration with four sides being formed by sheet metal forming operations or roll forming operation. The input absorbing member 132 may also be round or oval in cross section.

One side may include a seam 134 if the member 132 is closed. The flanges 136 forming the side including the seam 134 are shown extending toward each other to form the seam 134. Alternatively, the flanges 136 could be formed to extend outwardly. The impact absorbing member 132 may also be partially curved, curved, or an other polygonal shape member such as a pentagon, hexagon, octagon, or the like. It is preferred that none of the walls of the impact absorbing member 132 extend directly towards the impact source so that, upon impacting, the impact absorbing member 132 may deform primarily at the corners of the impacting absorbing member 132 so that it is not necessary to compress a wall lengthwise in an impact.

Upon an object striking the seat back shell 120, the seat back shell 120 causes one or more of the attached impact absorbing members 124, 132 to be driven into the seat back structural member 122. The impact absorbing members 124, 132 are deformed to absorb the impact energy. The characteristics of the impact absorbing members 124, 132 may be tuned or set to meet energy absorbing efficiency standards by simply changing the shape, orientation or size of the tab of impact absorbing member 134 or the thickness, configuration, size or shape of the impact absorbing member 132.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An impact absorbing assembly for a vehicle seat back comprising:
    a structural component of a vehicle seat;
    an impact absorbing member having a sheet form body portion and a plurality of tabs extending from the body portion, the tabs being partially separated from the body portion with a bendable hinge connection being provided along at least one edge of each tab; and
    a seat back shell enclosing the impact absorbing member on the structural component.

2. The assembly of claim 1 wherein the tabs extend from the body portion toward the seat back shell.

3. The assembly of claim 1 wherein the tabs extend from the structural component toward the seat back shell and wherein the ends of the tabs form the side facing away from the structural component to which the seat back shell is applied.

4. The assembly of claim 1 wherein the tabs are arranged in rows and columns on the body portion of the impact absorbing member.

5. The assembly of claim 1 wherein the body portion of the impact absorbing member is flat.

6. The assembly of claim 1 wherein the body portion of the impact absorbing member is curved.

7. The assembly of claim 1 wherein the tabs are formed into a partially circular shape.

8. An impact absorbing assembly for a vehicle interior comprising:
    a structural component of the vehicle seat defining an impact absorbing member having a body portion and a plurality of tabs extending from the body portion, the tabs being partially separated from the body portion with a bendable hinge connection being provided along at least one edge of each tab; and
    a seat back shell applied to the structural component of the vehicle seat that covers the tabs.

9. A method of making an impact absorbing assembly for a vehicle seat comprising:
    providing a sheet metal member;
    partially severing at least one tab from the sheet metal member;
    bending the tab to extend outwardly from one side of the sheet metal member and thereby forming a bendable hinge connection between the body portion and the portions of the tab that are not severed from the body portion where the tab is bent outwardly from the body portion; and
    affixing the sheet metal member to a seat back shell such that the bendable hinge allows the tab to absorb a part of a force applied to the seat back shell.

10. A method of absorbing impact forces applied when an occupant of a vehicle is thrust into a vehicle seat comprising:
    providing on the vehicle seat an impact absorbing member having a sheet form body portion and a plurality of tabs extending from the body portion, the tabs being partially separated from the body portion with a bendable hinge connection being provided along at least one edge of each tab;
    a seat back shell assembled over the impact absorbing member;
    applying a force to the occupant of the vehicle that causes the occupant to contact the seat back shell that is driven into the impact absorbing member with an amount of force greater than a threshold value;
    bending at least one of the tabs to cause plastic deformation of the tabs that absorbs a part of the force applied to the seat back shell by the occupant.

11. The method of claim 10 wherein the tabs are formed in accordance with impact absorption design criteria to provide impact absorption at specified locations in the interior of the vehicle wherein the size, shape, thickness, orientation and arrangement of the tabs may be varied to meet design criteria.

12. The assembly of claim 1 wherein the tabs extend from the body portion toward the structural component.

13. The assembly of claim 1 wherein the tabs extend from the seat back shell toward the structural component and wherein the ends of the tabs form the side facing away from the seat back shell to which the structural component is applied.

14. An impact absorbing assembly for a vehicle interior comprising:
    a structural component of a vehicle seat defining an impact absorbing member having a body portion and a plurality of tabs extending from the body portion, the tabs being partially separated from the body portion with a bendable hinge connection being provided along at least edge of each tab; and
    the structural component applied to a seat back shell of the vehicle seat that covers the tabs.

* * * * *